Oct. 24, 1967 E. C. KING ETAL 3,348,265
VACUUM MOLDING MACHINES
Filed June 20, 1963 6 Sheets-Sheet 1
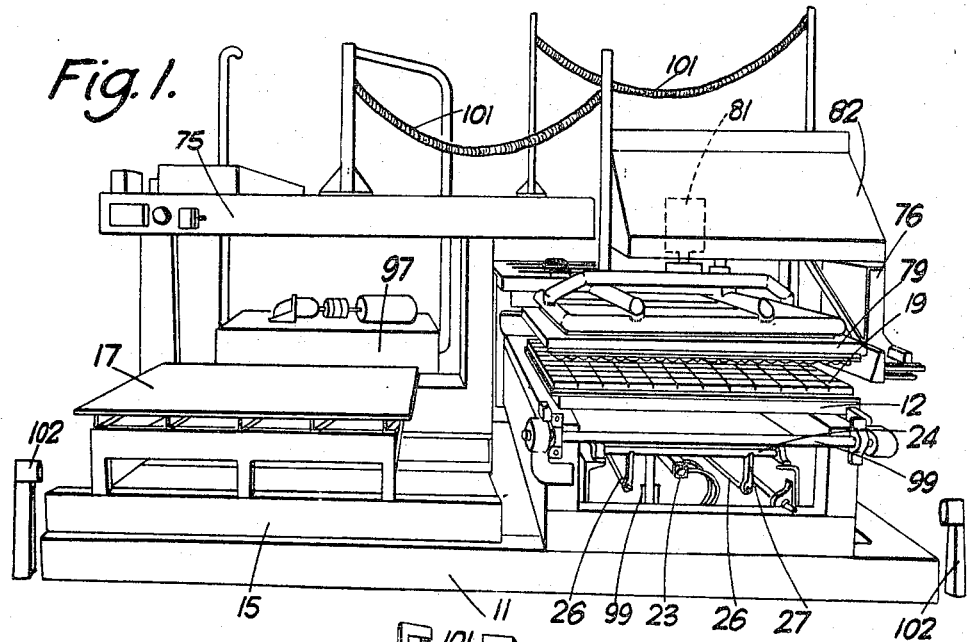
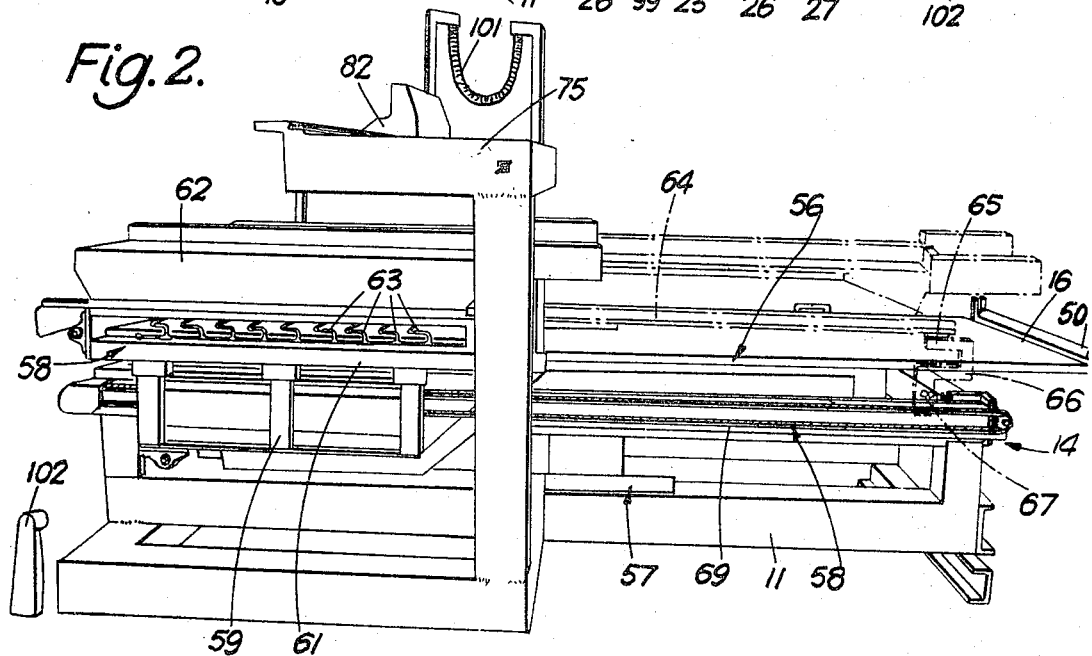
INVENTORS
EDWARD CARTER KING, ET AL
BY Mawhinney & Mawhinney
ATTYS.

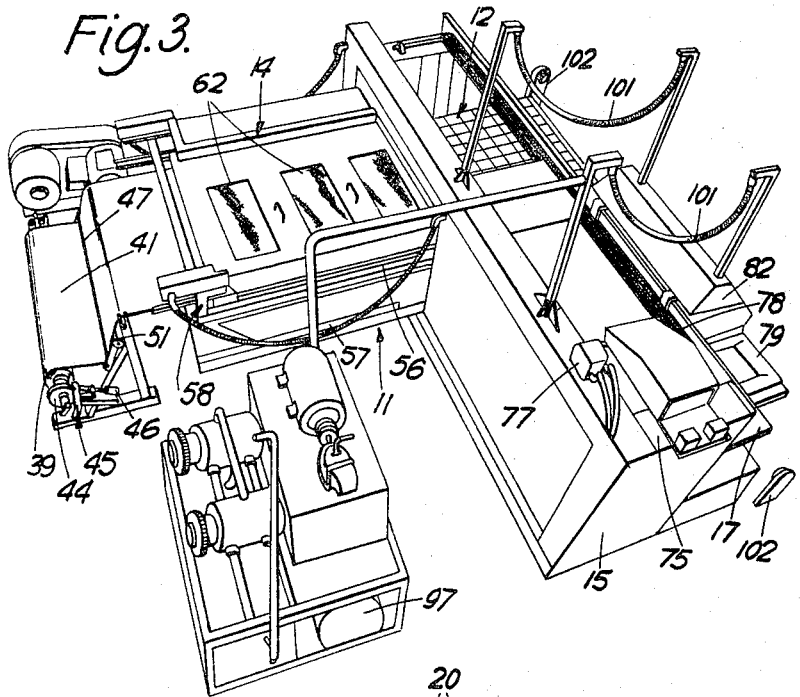
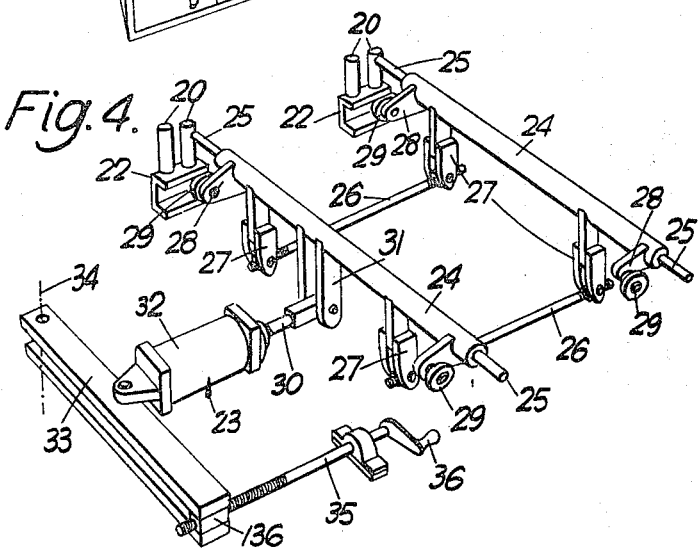

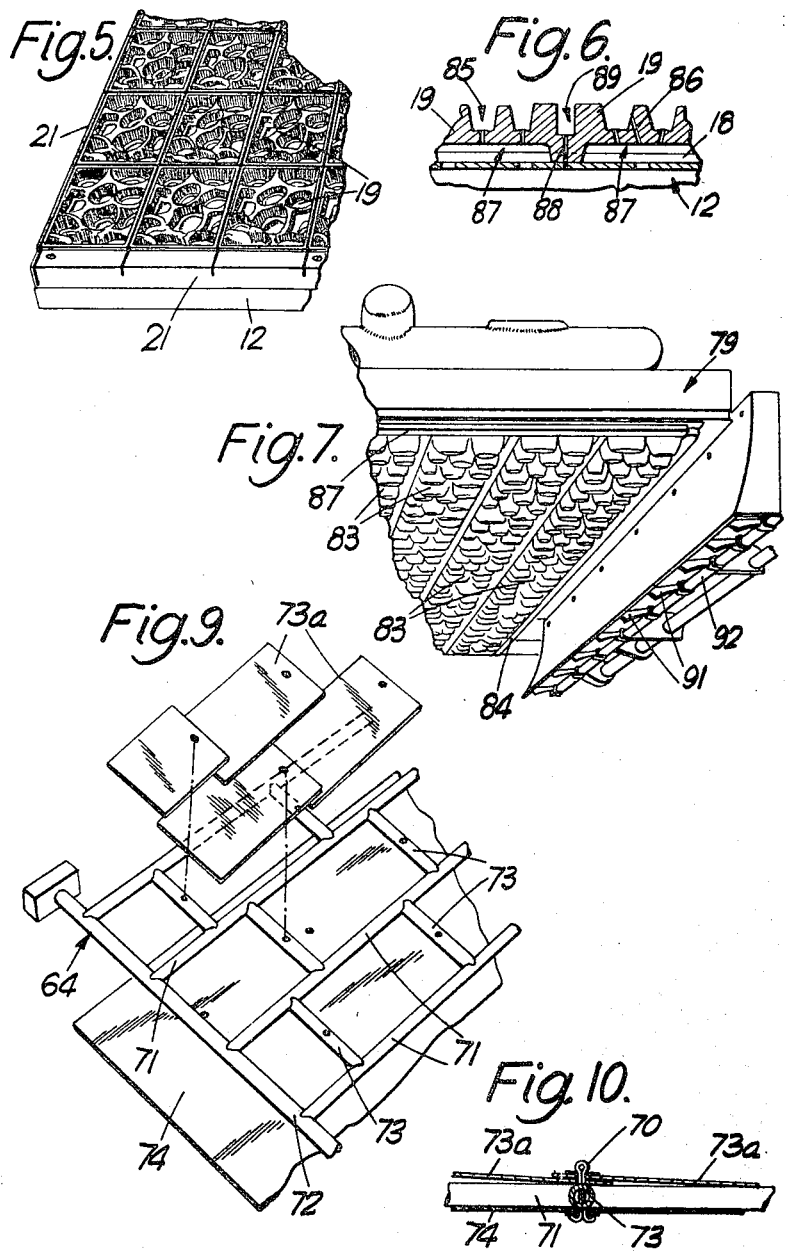

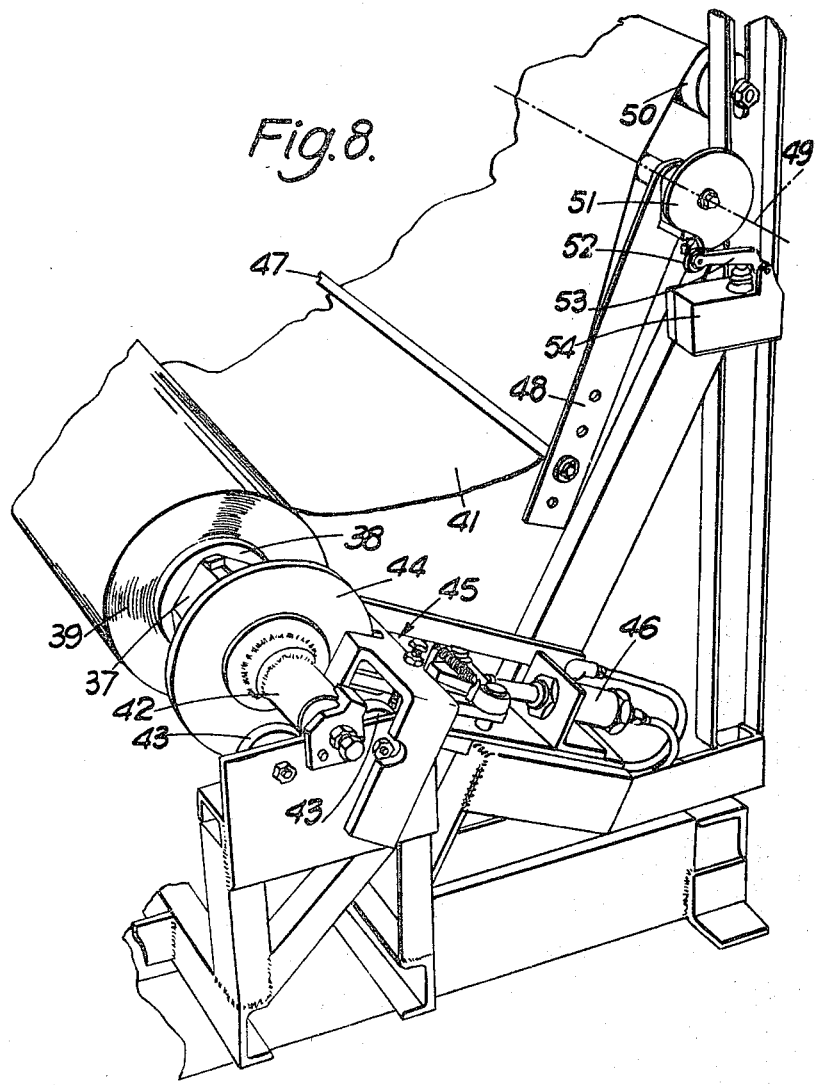

United States Patent Office 3,348,265
Patented Oct. 24, 1967

3,348,265
VACUUM MOLDING MACHINES
Edward Carter King and Peter John Michael Pardoe-Matthews, Royal Tunbridge Wells, England, assignors to King Packaging Limited, Royal Tunbridge Wells, England, a British company
Filed June 20, 1963, Ser. No. 289,359
Claims priority, application Great Britain, June 20, 1962, 23,845/62
8 Claims. (Cl. 18—19)

This invention relates to vacuum molding machines.

According to this invention in one aspect there is provided a vacuum molding machine comprising a vacuum mold shaped to form a plurality of articles from a sheet of thermoplastic material positioned over the mold which articles are arranged in a row, a heater assembly including a heater for heating the sheet, knife means, and means for traversing the knife means across the molded sheet for separating the articles from each other.

One embodiment of the invention will now be described by way of example with reference to the accompanying drawings. In the drawings:

FIGURE 1 is a perspective view of a vacuum molding machine of the invention from the front;

FIGURE 2 is a perspective view of the machine of FIGURE 1 from the side;

FIGURE 3 is a perspective view of the machine of FIGURE 1 from above;

FIGURE 4 is a perspective detail of the lifting means for the vacuum chamber;

FIGURE 5 is a detail of the molds;

FIGURE 6 is a section on line 6—6 of FIGURE 5;

FIGURE 7 is a detail of part of the pick-up head;

FIGURE 8 is a detail of the roll support;

FIGURE 9 is an exploded detail of the shield;

FIGURE 10 is a section through the shield;

Figure 11:
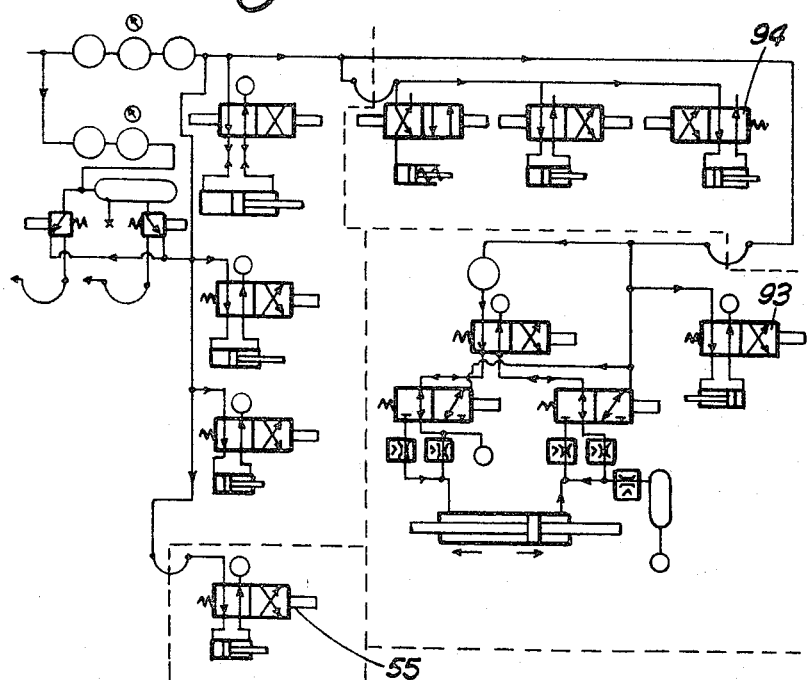
FIGURE 11 shows schematically the pneumatic circuit.

Referring now to the drawings and in particular FIGURE 3, a vacuum forming machine comprises an L-shaped frame 11 having a square vacuum chamber 12 formed at the junction of the arms 14 and 15 of the L. One 14 of the arms of the L is covered with a length 16 of sheet metal and constitutes an in-feed table. The other arm 15 carries at a location spaced from the vacuum chamber 12 a moldings reception table 17.

The vacuum chamber 12 has a square upper surface 18 on to which a number of molds 19 are secured (see FIGURES 5 and 6). Edging strips 21 are provided around the upper surface of the chamber 12 to maintain the molds 18 in position. The vacuum chamber 12 is mounted on a movable frame (not shown) supported at its corners by four pairs of support columns 20 carried on a number of channel section frame members 22. This frame is connected for movement in a generally vertical direction by an hydraulic or pneumatic jack 23 through a linkwork (see FIGURE 4) which comprises a pair of transverse shafts 24 journalled at their ends 25 and connected for movement together by a pair of connecting rods 26, the ends of which respectively engage in depending arms 27 secured to the cross shafts 24. The cross shafts 24 carry crank arms 28 which carry bearings 29 at their ends. The outer races of the bearings 29 engage in the frame members. The piston rod 30 of the jack 23 engages between a further pair of arms 31 depending from one of the cross shafts 24. The cylinder 32 of the jack is pivoted between a pair of levers 33 which are pivoted at one end and which are movable about the axis 34 of the pivot by a screw device 35 engaging in a nut 36 at the other end of the levers 33. The screw device 35 has a square end for receiving a handle 36. By altering the position of the pair of levers 33 the amount of travel of the crank arms 28 can be varied so that the upward movement of the vacuum chamber 12 can also be altered.

At opposite sides of the end of the feed table 16 remote from the vacuum chamber 12, there are provided (see FIGURE 8), below the level of the table, a pair of conical inserts 37 (only one shown) on to which the core 38 of a roll 39 of flexible thermoplastic sheeting material 41, e.g. polyvinyl chloride, can be mounted. Stub shafts 42 carrying these inserts 37 are mounted on rollers 43 for rotation. One of the shafts 42 carries the disc 44 of a disc brake 45. This disc brake 45 is operable by means of a pneumatic jack 46 as will be hereinafter described. The sheeting 41 from the roll 39 is led under a cross rod 47 over a roller 50 and then on to the table 16. The cross rod 47 is mounted near the ends of a pair of arms 48 which are pivotable about a common axis 49 near the level of the table 16. Mounted for rotation with these arms 48 is a cam disc 51 which is engaged by a follower roller 52 carried on an arm 53 pivoted on to the housing of a microswitch 54. The surface of the cam 51 is so shaped that when the arms 48 hang loosely downwards as will be hereinafter described microswitch 54 will be closed and will in turn, through a relay 55 (see FIGURE 11) actuate the brake jack 46 so that the disc brake 45 will be applied.

Running along the length of the feed table 16 and extending along the sides of the vacuum chamber 12 are a pair of upper and a pair of lower support surfaces 56 and 57 respectively (see FIGURES 2 and 3). Above the table 16 is a clamp frame 58 which has an area, in plan, slightly greater than the area of the mold chamber 12 and which has two side structure members 59 depending from each side and running on the lower guide surfaces 57. This clamp frame 58 includes a pair of facing channel members 61 at each side into which pairs the edges of the polyvinyl chloride sheeting are respectively received. A number of small hydraulic or pneumatic jacks 63 are provided along the sides of these members 61. The jacks 63 on each side carry, on their piston rods (not shown), a common head which, when the jacks are actuated, clamp the edges of the sheeting 41 against the upper of the flanges of the channel members 61. These jacks 63 are located at closely spaced locations so that the heads will provide an even grip on the edges of the sheeting 41; there being, in all nine jacks on each side. Also carried on the clamp frame 58 and located above the channel members 61 is an electrical radiant heating device 62 of any convenient construction which covers an area equal to the area of the mold. A metallic shield 64 (see also FIGURES 9 and 10) is provided underneath the heater. This shield is mounted on a frame 65 having downwardly depending members 66 which carry rollers 67 that run on the upper (58) of the supporting surfaces. Both rear depending members 66 have further depending lugs 68 which are connected respectively to endless chains 69 at each side so that the shield frame 65 and the clamp frame 58 may be moved in and out. The shield frame 65 is however disconnectable from the clamp frame 58 so that the shield 64 may be moved independently of the heater 62. The frame of the shield comprises a number of spaced hollow longitudinally extending tubular members 71 (see FIGURE 10) which are connected at their ends to tubular end cross pieces 72 and, throughout their length, by a number of short offset cross pieces 73. An aluminum sheet 74 is secured to the frame 64 on its underside. On the upper side of the frame, a number of small overlapping sheets 73 of aluminum or stainless steel are provided.

The sheets 73 are secured to the frame 64 by means of split pins or bolts 70 passing through the cross members. Where the heating device operates at a high output, say over 1.5 kilowatts per square foot, the tubular members may be drilled at the junctions of the longitudinally and transversely extending members to provide a degree of air cooling for the shield.

The main frame 11 is provided with a heavy super-structure 75 (see FIGURES 12 and 13) running over the main vacuum chamber 12 and over the delivery arm 14 of the L. A pick-up frame 76 is mounted for reciprocating movement along this super-structure 74 by a rotary motor 77 through a chain drive 78. This pick-up frame 76 carries a vertically reciprocable vacuum pick-up head 79 which is of the same area in plan as the vacuum chamber 12. The pick-up head 79 is vertically movable upwardly and downwardly on the pick-up frame by a jack 81 mounted on a platform above the head 79 in a control compartment 82 mounted on the pick-up frame 76. The vacuum head 79 carries a number of lifting devices 83 which are of the same shape as the cavities of the molds 19 but smaller by the thickness of the polyvinyl chloride sheeting (see FIGURE 7). Rubber sealing strips 84 are fixed on the vacuum head 79 at the correct position to engage with the outer flanges of the cut moldings (as will be described). The pick-up frame 76 is movable from an inner positon (shown in full lines in FIGURE 1) in which the pick-up head 79 overlies the main vacuum chamber 12 to an outer position (shown in chain lines in FIGURE 1) in which the pick-up head 79 overlies the delivery table 17.

The various mold parts 19 are constituted by blocks having a shaped portion 85 on one side thereof (see FIGURE 6). A number of air holes 86 pass from the opposite side of the block to the shaped side so that there are a number of spaced openings at each mold cavity. This said opposite side is provided with a recess or recesses 87 into which these various air holes 86 open and the recess is surrounded by a rim 88. The blocks 19 rest on the rims 88 and are secured to an apertured mold support plate 18 carried on support blocks on and forming the upper surface of the vacuum chamber 12.

The mold parts 19 on the main vacuum chamber 12 have on their sides adjacent the shaped portions 85 a short recess 89 so that when the mold parts are placed side by side a groove is formed around each mold part 19. Retractable knives 91 are carried on a shaft 92 secured to the leading edges of the pick-up frame 76. The shaft 92 is rotatable by jacks 93. Similar retractable knives (not shown) are carried on the leading edge of the clamp frame 58 and are operable by jacks 94. In practice when the clamp carriage 58 is being retracted from its position over the main vacuum chamber 12 the knives on the clamp frame are moved to the operable position to co-operate with the grooves 89 between the molds to make longitudinal cuts in a sheet 41 of thermoplastic material whilst, when the pick-up frame 76 is moved to its position over the vacuum chamber 12, the knives 91 will be lowered and will co-operate with the grooves 89 in the molds to make transverse cuts in the sheeting 41.

The two vacuum chambers 12 and 79 are connected to a vacuum source 97 and a pneumatic pressure source 98. The main vacuum chamber 12 is connected to this air supply through a sliding seal 99 (partially shown in FIGURE 1) to compensate for the vertical movement of the vacuum chamber 12 as aforedescribed.

The vacuum chamber 79 on the pick-up carriage 76 is connected to the source of vacuum 97 and to a source of air under pressure 98 through a number of flexible tubes 101.

An electric eye device 102 is provided in front of the machine as a guard to shut off power supply to the machine should any person approach too closely.

The machine operates as follows: The clamp carriage 59 at the commencement of operation is above the table 16 (as shown in chain lines in FIGURE 1). A roll 39 of polyvinyl chloride sheeting 41 is placed on the conical inserts 37. The sheeting 41 is led under the cross member 47, over roller 50 and thence above the table 16 where its edges are threaded into the side members 61 of the clamp frame 58. Pressure is now connected to the clamp jacks 63 which close on to the edges of the polyvinyl chloride sheeting 41 and hold it in position. The clamp frame 58, including the heater 62 and shield 63, is then moved forwardly so that the forward part of the sheeting 41 together with the super-structure on the clamp frame 62 overlies the main vacuum chamber 12 (as shown in full lines in FIGURE 1). The main vacuum chamber 12 is then raised to its raised position so that the edge members 21 surrounding the molds 19 seal against the undersides of the upper flanges of the channel members 61. The heating shield 63 is then withdrawn so that heat from the heater 62, which is continuously heating, is radiated on to the sheeting 41. After a suitable delay period during which time the sheeting 41 becomes soft and workable, vacuum is applied to the vacuum chamber 12 so that the sheeting is drawn tight against the molds 19. The shield 63 is then moved forward between sheeting 41 and the heater 62. The mold chamber 19 is lowered and the clamping jacks 63 are now rendered inoperative. The clamp knife actuator jack 94 is actuated so that the knives on the clamp frame move to their operative positions. The clamp frame 58 is then returned to its inoperative position during which time the knives engage in the grooves 89 between the molds 19 to make longitudinal cuts in the molded sheeting 41. When the clamp frame 58 is in its retracted position the clamp knife actuator 95 is de-energised so that the clamp knives are moved to their inoperative position. As the clamp frame 58 is moved into its inoperative position the pick-up frame 76 is moved into its operative position. As it moves inwardly the pick-up knife actuator 93 is energised so that the knives 91 on the pick-up frame are moved into their operative position and make transverse cuts in the molded sheeting 41 which is now divided into a number of rectangular shaped positions. The pick-up head 79 is then lowered so that the male mold members or pick-up members 83 engage in the now shaped rectangular polyvinyl chloride parts. Vacuum is now applied to the pick-up head vacuum chamber 79. Shortly thereafter the main vacuum chamber 12 is disconnected from the vacuum source 97 and connected to the source of pressure 98 thus blowing the molded members out of the mold parts 19 and on to the pick-up members 83. The pick-up head 79 is then raised, the pick-up frame 76 traversed to its outer position, and the pick-up head lowered. The pick-up vacuum chamber is connected to the source of pressure and the shaped portions are blown off on to the receiving table 17. During the time that the pick-up head 79 is over the receiving table 17, the clamp carriage 58 is moving forwardly as aforedescribed and the cycle is repeated.

If the reel 39 rotates faster than required the polyvinyl chloride sheeting 41 passing under the cross bar 47 will become too slack. The cross bar 47 will thus fall and the cam will move the cam follower 52 to operate the switch 54 so that the disc brake 45 is applied. The speed of rotation of the reel 39 is thereby retarded. Check means are provided for controlling the various movements of the pick-up and carriage frame so that the various parts are not subject to undue accelerations or decelerations.

Figure 12:
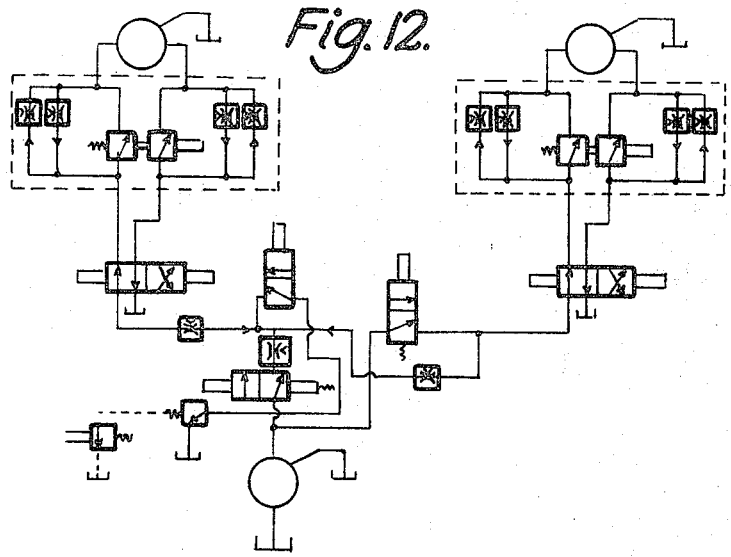
FIGURE 12 shows schematically the hydraulic circuit.
Figure 13:
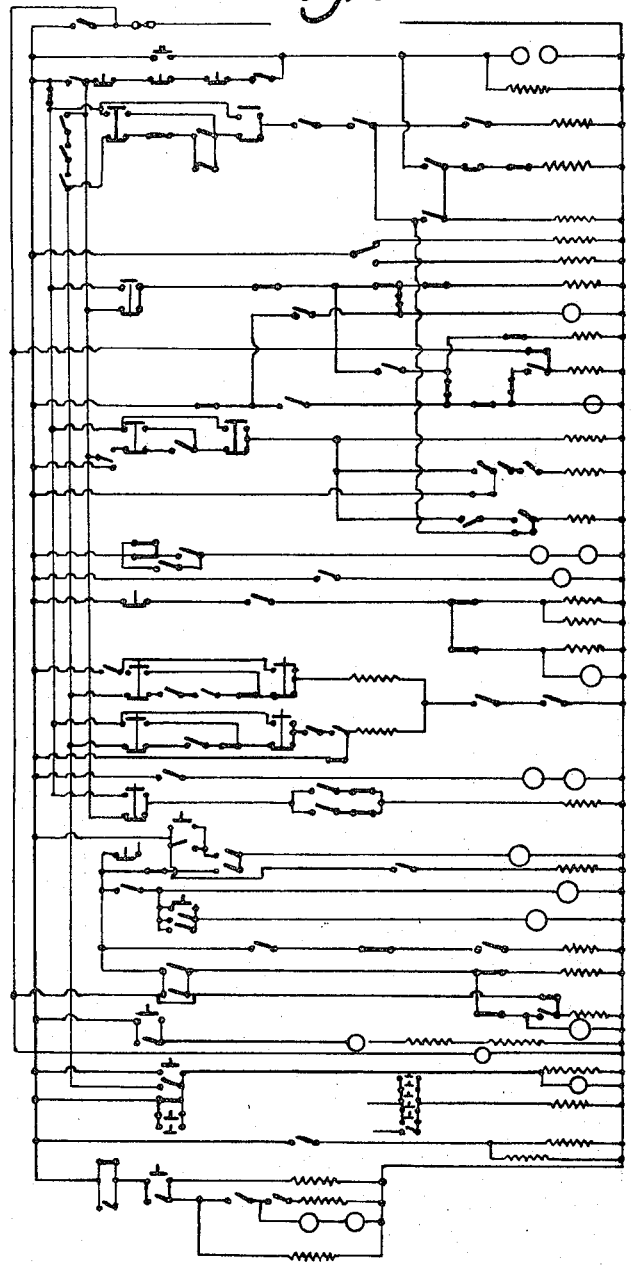
FIGURE 13 shows schematically the electrical circuit of the machine.

The hydraulic, pneumatic and electrical circuits for the various jacks, switches etc. are shown in FIGURES 11, 12 and 13. These are not described in detail as their operation will be apparent to those skilled in the art. It is to be appreciated that microswitches etc. are provided to indicate the end of each operation.

The invention is not limited to the precise constructional details hereinbefore described and illustrated in the accompanying drawings. For example, the clamp frame and its guide surfaces may be mounted on a pivoted framework so that the main mold chamber need not move as aforedescribed. The heater which can be in two parts may be moved away from the vacuum chamber instead of utilising a shield. Furthermore the jack for lifting the pick-up head may include a pressure sensitive device so that the pick-up head will normally compress the moldings on the moldings reception table so that these will nest satisfactorily. Instead of clamps, an expandable pipe may be inserted in each channel member to grip the edge of the sheeting against the flange of that member. Further the brake on the stub shafts may be continuously applied, the pressure of the brakes being variable to suit the weight or diameter of the reel. Yet again the reel could be driven by an hydraulic motor series connected to the clamp carriage drive motor through a speed control valve varied by the sheet tension. The position at which the knives operate is variable according to the size of the molding and the required point of entry. Furthermore instead of providing a recess on the under surface of the mold blocks, these may be mounted on an intermediate porous member, made e.g. of wire gauze or expanded metal, which rests on the apertured mold support plate. In these circumstances, the mold box will be provided with side pieces, which may be integral therewith, which seal against the sides of the molds.

Further the shield may comprise a single sheet of thick aluminum. This would be secured at a single point to allow for expansion.

Also depending upon the length of sheeting required to be located above the vacuum chamber, the clamps 63 may open so that the sheet is released at a predetermined but variable point on the inward movement. The clamps 63 close again when the carriage completes the movement.

We claim:

1. A vacuum molding machine comprising a vacuum mold shaped to form a plurality of articles from a sheet of thermoplastic material positioned over the mold, which articles are arranged in a row, a heater assembly including a heater for heating the sheet, knife means, means for traversing the knife means across the molded sheet for separating the articles from each other, the knife means comprising a set of knives mounted on the heater assembly, and said means for traversing the knife means comprising means for moving the heater assembly and the vacuum mold laterally relative to each other.

2. A vacuum molding machine as claimed in claim 1, wherein means is provided for moving the knives relative to the heater assembly into an operative position in which the knives project towards the vacuum mold and into a retracted position.

3. A vacuum molding machine comprising a vacuum mold shaped to form a plurality of articles from a sheet of thermoplastic material positioned over the mold which articles are arranged in a row, a heater assembly including a heater for heating the sheet, knife means, means for traversing the knife means across the molded sheet for separating the articles from each other, lifting means for lifting the molded articles from the vacuum mold, said knife means comprising a set of knives mounted on the lifting means, and said means for traversing the knife means comprising means for moving the lifting means and the vacuum mold laterally relative to each other.

4. A vacuum molding machine as claimed in claim 3, wherein means is provided for moving the knives relative to the lifting means into an operative position in which the knives project towards the vacuum mold and into a retracted position.

5. A vacuum molding machine as claimed in claim 3, wherein the lifting means incorporates a vacuum lifting head adapted to face the vacuum mold which lifting head is of complementary form to the vacuum mold whereby the contours of the lifting head conform to those of the articles molded from the sheet.

6. A vacuum molding machine as claimed in claim 5, comprising a source of air under pressure to which the lifting head is connected for facilitating release of the articles from the lifting head.

7. A vacuum molding machine comprising a vacuum mold shaped to form a plurality of articles from a sheet of thermoplastic material positioned over the mold which articles are arranged in a row, a heater assembly including a heater for heating the sheet, knife means, means for traversing the knife means across the molded sheet for separating the articles from each other, the articles being arranged in a pattern of rows extending in two mutually transverse directions, lifting means for lifting the molded articles from the vacuum mold, said knife means comprising a first set of knives mounted on the lifting means and a second set of knives mounted on the heater assembly, said means for traversing the knife means comprising means for moving the heater assembly in one of said directions laterally into and out of a position facing the vacuum mold, and means for moving the lifting means in the other of said directions into and out of a position facing the vacuum mold.

8. A vacuum molding machine comprising a base, a vacuum mold mounted on the base and providing mold cavities for a plurality of articles the mold cavities being arranged in rows extending in two directions at right angles to each other, means to one side of the vacuum mold for supporting a rotary supply reel of thermoplastic sheeting, a clamp frame adapted to grip the side edges of a leading portion of the sheeting, a heater assembly comprising a heater element and a shield beneath the heater element, means for moving the clamp frame and heater assembly together laterally forward in one of said directions to bring the heater assembly and a length of the sheeting into a position over the mold, automatic braking means for controlling rotation of the supply reel in relation to the speed of forward movement of the clamp frame, a set of knives mounted on a forward edge of the heater assembly and respectively aligned with gaps between the rows of cavities in the mold, a vacuum lifting head, means for moving the vacuum lifting head laterally forward and backward in the other of said directions into and out of a position over the mold, and a set of knives on a forward edge of the lifting head which knives are respectively aligned with gaps between the rows of cavities in the mold.

References Cited

UNITED STATES PATENTS

| | | | |
|---|---|---|---|
| 1,531,504 | 3/1925 | Roberts | 264—163 X |
| 2,077,508 | 4/1937 | Bierer | 264—160 |
| 2,655,196 | 10/1953 | Magnani | 18—19 XR |
| 2,691,798 | 10/1954 | Winchester et al. | 18—19 |
| 2,836,852 | 6/1958 | Butzko | 18—19 |
| 3,113,345 | 12/1963 | Butzko | 18—19 |
| 3,127,497 | 3/1964 | Taylor | 18—19 XR |
| 3,157,719 | 11/1964 | Ferrari | 264—92 |
| 3,207,821 | 9/1965 | Jones-Hinton et al. | 18—19 XR |

ROBERT F. WHITE, *Primary Examiner.*

M. R. DOWLING, A. R. NOE, *Assistant Examiners.*